United States Patent
Hauser et al.

[11] Patent Number: 5,728,418
[45] Date of Patent: Mar. 17, 1998

[54] TWISTED QUICK COOKING PASTA

[75] Inventors: Thomas Wilhelm Hauser, Eboli, Italy; Lorenzo Panattoni, Winterthur, Switzerland

[73] Assignee: Nestec S.A., Vevey, Switzerland

[21] Appl. No.: 574,010

[22] Filed: Dec. 18, 1995

[30] Foreign Application Priority Data

Dec. 22, 1994 [EP] European Pat. Off. ............ 94120376

[51] Int. Cl.⁶ .................................................... A23L 1/16
[52] U.S. Cl. .................... 426/557; 426/451; 426/500; 426/514
[58] Field of Search ...................... 426/557, 451, 426/500, 514

[56] References Cited

U.S. PATENT DOCUMENTS 2,062,338  12/1936  Tanzi ........................................ 107/14

FOREIGN PATENT DOCUMENTS 557139  8/1993  European Pat. Off. .

Primary Examiner—Lien Tran
Attorney, Agent, or Firm—Pennie & Edmonds

[57] ABSTRACT

Twisted quick cooking pasta having, in transverse section, the shape of a helix having at least one blade attached to an axis, the axis being hollow, the wall thickness of the axis and of the blade or blades being between 0.3 and 1.1 mm, and the degree of twisting being such that it has a density of between 0.2 and 0.7 g/cm³, the volume being defined as the cylindrical space occupied by the pasta.

13 Claims, 2 Drawing Sheets

TWISTED QUICK COOKING PASTA

TECHNICAL FIELD

The subject of the present invention is a new quick cooking twisted pasta.

BACKGROUND OF THE INVENTION

Various quick cooking pastas are known. EP 0,450,428 thus describes a "spaghetti" which can be cooked in a minimum time of 2 min, composed of three lobes forming outer grooves, the lobes being longitudinal, parallel and angularly equidistant at 120°.

Similarly, EP 0,557,139 describes long and tubular pastas which can be cooked in perforated sachets in 5 min, these cooked pastas not agglomerating because of striations provided on their surface.

European Patent Application 94112910.8 also describes long and tubular pasta having teeth of specific sizes at the inner surface of the tube, and capable of being cooked in 5 min, these cooked pastas not becoming oval-shaped and having a texture in the mouth equivalent to that of traditional cooked pastas of the same type.

Finally, a traditional pasta of the helix type is known which is marketed in Italy (Ghiottoli, De Cecco), which cooks in 10–12 min and which has, in transverse section, the shape of a helix with 4 blades attached to a hollow axis, the wall thickness of the axis and of the said blades being of the order of 1.2–1.4 mm, and the hole diameter of the axis being of the order of 1.5–2 mm. This hole makes it possible to obtain a more homogeneous cooking of the walls of the axis and of the blades of the pasta. It may also be noted that this hole does not close during the cooking.

SUMMARY OF THE INVENTION

The aim of the present invention is to provide a new quick cooking pasta of the helix type, it being possible for the pastas to be cooked in 5 min and the pastas having a texture in the mouth equivalent to that of traditional pastas of the helix type.

To this end, the twisted quick cooking pasta according to the present invention has, in transverse section, the shape of a helix comprising at least one blade attached to an axis, the axis being hollow, the wall thickness of the axis and of the blades being between 0.3 and 1.1 mm, and the degree of twisting being such that it has a density of between 0.2 and 0.7 g/cm³, the volume being defined as the cylindrical space occupied by the pasta.

DETAILED DESCRIPTION OF THE PREFERRED EMBODIMENTS

In the rest of the description, "traditional pasta of the helix type" is understood to mean an oblong and twisted pasta, which is generally cooked in 10 to 15 min, having in transverse section the shape of a helix comprising at least one blade attached to an axis, the blades being twisted around the axis of the pasta, and the wall thickness of the blades and of the axis being generally greater than 1.1 mm ("Die gute form", M. Götz et al., Museum für gestaltung Basel, 1991).

Similarly, the volume defined as "the cylindrical space occupied by the pasta" may be calculated by multiplying the length of the pasta by the surface area of the circle delimited by the ends of the blades in transverse section.

Finally, the texture in the mouth of the cooked pastas according to the invention may be defined, during a testing test by a sample of people, as the sensation of firmness of these pastas in the mouth compared with that of traditional pastas of the helix type. This assessment of the texture can also be correlated with the measurement of the resistance of the pastas according to the invention to cutting using a texture analyser, such as the Instron analyser (model 1011) equipped with a Kramer cell, for example.

The advantages of the product according to the present invention, noted during tests which were carried out, are as follows:

cooking time of about 5 min according to the traditional method (boiling water), that is to say reduced by more than 50% compared with the time required to cook a traditional pasta of the helix type having the same number of blades;

texture in the mouth having a firm consistency, highly reminiscent of that of traditional pastas of the helix type, capacity to adsorb condiments which is greater than that of traditional pastas of the helix type on account of the presence of the hole in the axis which allows better penetration of the condiments, rigidity of the cooked pasta according to the invention similar to that of traditional cooked pastas of the helix type due to the fact that the hole in the axis closes during the cooking, homogeneous cooking of the walls of the axis and of the blades giving a texture in the mouth which is also homogeneous.

The pastas according to the present invention are thus twisted to a degree such that they have a density, as defined above, of between 0.2 and 0.7 g/cm³, preferably of between 0.4 and 0.6 g/cm³. The density of the pasta according to the invention is indeed relatively high; it is what makes it possible to confer on the cooked pasta a texture in the mouth equivalent to that of traditional pastas of the helix type.

This density may thus be correlated with the degree of twisting of the blades, that is to say for a given blade the distance which it takes along the axis to perform 360°, that is to say one turn or one spire. Thus, the degree of twisting of the blades may vary as an inverse function of the number and of the height of the blades. Indeed, the higher the number and the height of the blades, the smaller may be the degree of twisting because the quantity of pasta per unit volume will be higher. Because of these, a pasta according to the invention having 4 blades having a height from the center of the axis of the pasta of 3–5 mm may exhibit a degree of twisting of the order of one spire per 1.6–1.8 cm along the axis, such that the pasta finally has a density of between 0.2 and 0.7 g/cm³, for example.

It should however be noted that this density may also depend on the wall thickness defined below, and on the composition of the pasta which is generally standard. Accordingly, they may only constitute variables which make it possible to adjust the degree of twisting of the blades.

The pastas according to the invention also have a tubular axis, which is relatively important in order to allow homogeneous cooking of the walls of the axis and of the blades. However, a hole in the axis having a diameter of between 0.5 and 1.3 mm is preferably chosen in order to allow optimum penetration of the boiling water into the axis, and in order also to allow the complete blocking of the hole due to the swelling of the walls of the axis. Indeed, an excessively small diameter would prevent the water from penetrating into the axis and therefore from cooking the walls of the pasta in 5 min. Furthermore, an excessively high diameter would prevent complete blocking of the axis during the cooking, which is in fact important in order to confer rigidity to the pasta, which is particularly appreciated by consumers.

It should also be noted that the ends of the pastas according to the invention are somewhat crushed due to the cut generally performed by a rotating knife during their manufacture. Because of this, the diameter of the hole in the axis at the ends of the pastas according to the invention may vary over the above-mentioned values.

The walls of the axis and of the blades of the pastas according to the invention therefore have a thickness of between 0.3 and 1.1 mm, or even between 0.4 and 1 mm. However, a wall thickness of the axis of between 0.3 and 0.7 mm, and a wall thickness of the blades of between 0.6 and 1.1 mm, or even of between 0.8 and 1.1 mm, for example, may be particularly recommended.

In addition, the ratio between the wall thickness of the blades and the wall thickness of the axis may also play a significant role in the sensation of texture in the mouth of the cooked pasta according to the invention. Indeed, when the hole in the axis of the pasta closes during cooking, the thickness of the wall of the axis felt under the tooth increases. If it is therefore desired that the firmness of the wall of the blades and of the axis of the cooked pasta are comparable, which is appreciated by the consumer, it is preferable that the "p/a" ratio between the thickness "p" of the wall of the blades and the thickness "a" of the wall of the axis be between 1.2 and 2, or even between 1.3 and 1.6.

Finally, the pastas according to the invention may be manufactured by production means already known to those skilled in the art, and may then be marketed within the ranges of pastas of the helix type.

In particular, in order to manufacture the pastas according to the present invention, wheat semolina, especially from the species *Triticum durum* and *Triticum aestivum*, may be mixed with water up to a water content of 25–35%, in a standard mixer, for example. The mixture may then be kneaded for 10 to 15 min at a temperature of 30° to 35° C. Preferably, in the last 5 to 8 minutes of the kneading, the absolute air pressure in the mixer is reduced by vacuum suction to 30 to 130 millibar, so as to remove air bubbles from the mixture.

The cereal dough may then be introduced into a single-screw extruder, for example, and the dough may be extruded at a pressure of 80 to 150 bar, while cooling the body of the extruder with water so that the temperature of the dough does not exceed 45° to 55° C., for example. A knife placed at the outlet of the die may then cut the extruded pasta into pieces of pasta between 0.5 cm and 20 cm in length, for example.

The shape of the pastas according to the invention may be obtained by giving the orifices of the die a shape corresponding to that of the pastas according to the invention, taking into account the shrinkage of the pastas during their subsequent drying.

The pieces of pasta may be dried in a conventional manner until they have a water content of between 10 and 13%, preferably of between 11.4 and 12.3%, for example. The dried pastas, which have a temperature of the order of 60° to 82° C. at the outlet of the drying device, may then be cooled to an ambient temperature of the order of 25° C., for example, and they may then be packaged in plastic bags, for example.

The pasta according to the present invention is described below with reference to the accompanying drawing, in which,

EXAMPLES

Example 1

Figure 1:
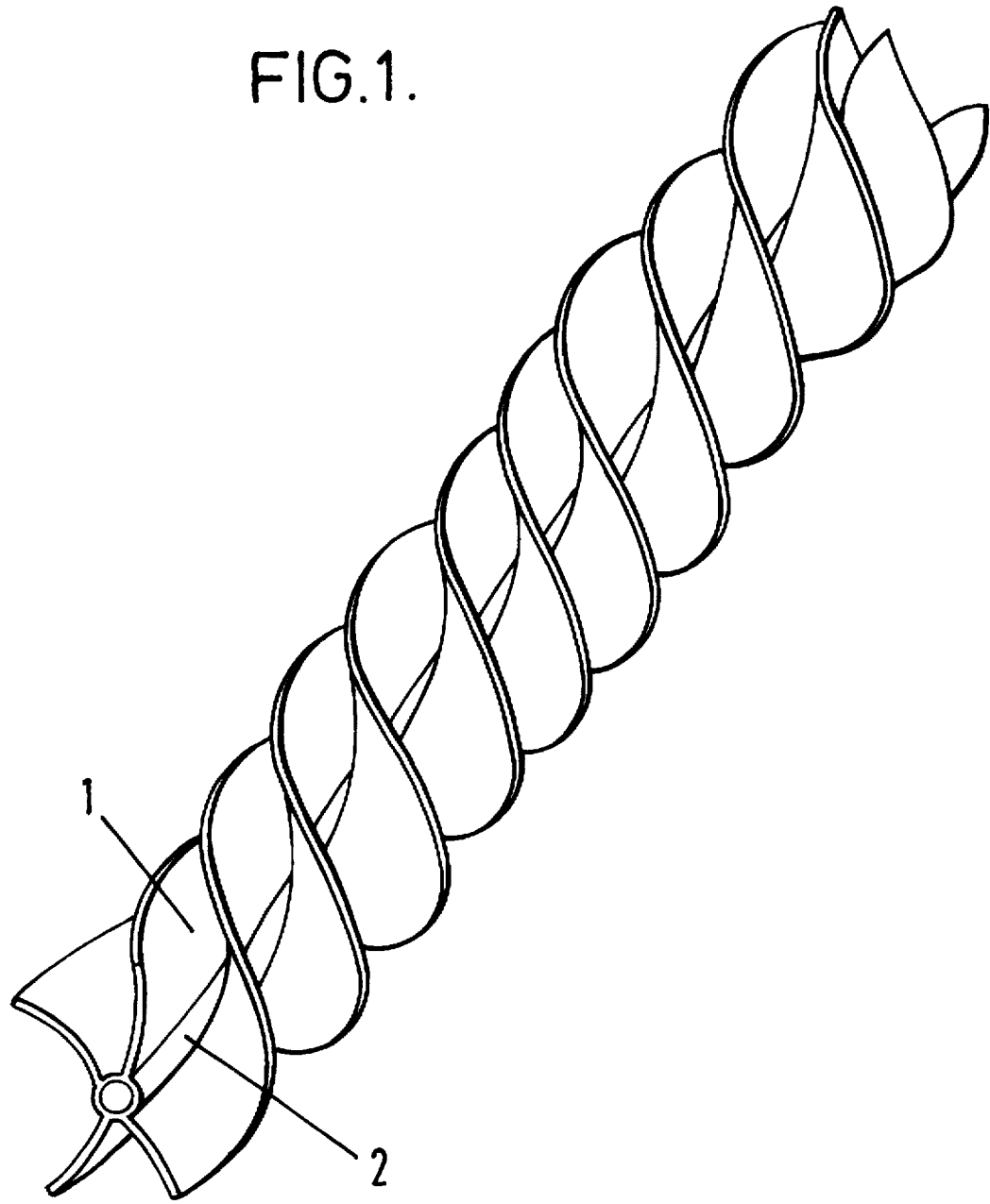
FIG. 1 is a view in perspective, on an enlarged scale, of one embodiment of the pasta having four blades.
Figure 2:
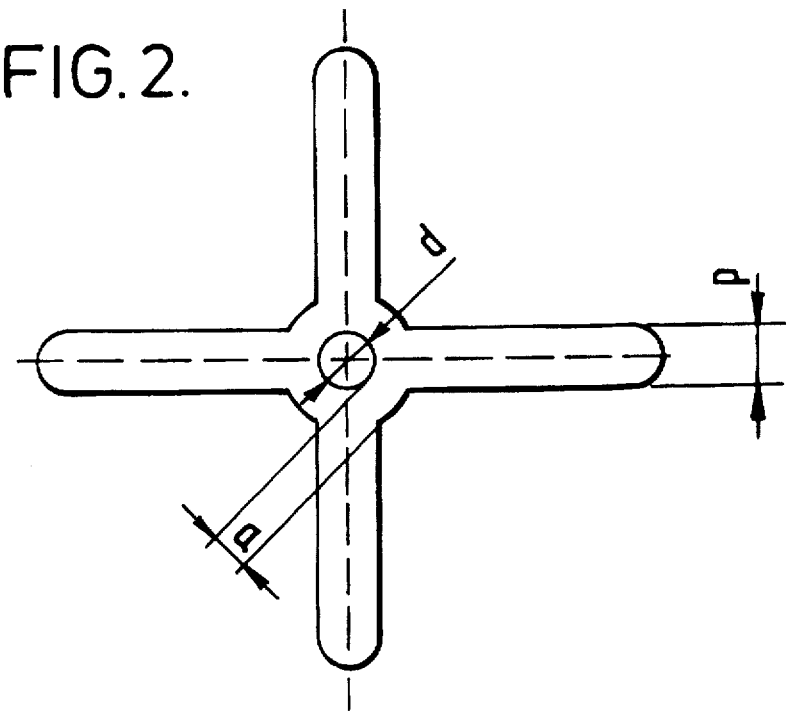
FIG. 2 is a view in transverse section, on a scale enlarged 10 times, of the pasta with four blades presented in FIG. 1.

Pastas similar to those illustrated in FIGS. 1 and 2 are manufactured by traditional production means used by those skilled in the art.

As may be seen in FIG. 1., these pastas have four blades "1" which are longitudinal, equiangular and twisted relative to the tubular axis "2" of the pasta.

Furthermore, as described in FIG. 2, in transverse section, the mean thickness of the wall of the blades "p" is 0.8 mm, the mean thickness of the wall of the tubular axis "a" is 0.5 mm, and the mean diameter "d" of the hole of the axis is 0.7 mm.

These pastas have, in addition, a length of 40 mm, blades with a mean height, from the center of the axis, of 8 mm and a degree of twisting of the blades of the order of 1 spire per 1.7 cm along the axis, so that the density of the pasta, as defined above, is of the order of 0.44 g/cm$^3$.

For comparison, traditional slow cooking pastas of the helix type are produced which have a length of 40 mm and have three blades which are longitudinal, equiangular and twisted relative to the solid axis, the thickness of the wall of the said blades being of the order of 1.2 mm, their height being 8 mm, their degree of twisting being of the order of 1 spire per 2.2 cm along the axis, and the diameter of the said axis being 1.5 mm. Such a pasta cooks, under the conditions described below, in 10 min.

These two types of pastas are cooked in fully boiling water with addition of 10 g/l of salt, until an inner white portion consisting of gelatinized starch is still seen in the wall of the blades, with the naked eye.

The firmness of the above cooked pastas is then determined, at a temperature of 65° C., using an Instron texture analyser (model 1011) equipped with a Kramer cell which is driven at a cut/shear rate of 500 m/min. The results, expressed in Newton, are illustrated in Table 1 below.

TABLE 1

| Pastas | Instron Apparatus (Newton) |
| --- | --- |
| According to the invention | 682 |
| Slow cooking traditional | 937 |

As may be seen in the above table, the pastas according to the invention have a firmness which is markedly similar to slow cooking traditional pastas.

The cooking time of the pastas of the invention, as well as the assessment of their texture in the mouth by a group of people during a tasting test, are illustrated in Table 2 below.

Example 2

Figure 3:
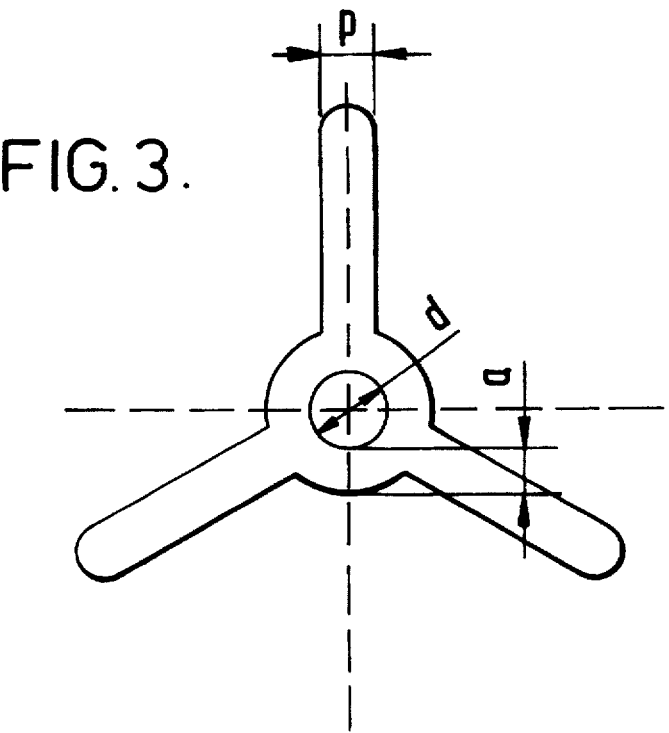
FIG. 3 is a view in transverse section, on a scale enlarged 10 times, of another embodiment of the pasta having three blades.

Pastas similar to those illustrated in FIG. 3 are manufactured by standard production means used by those skilled in the art. These pastas have three blades which are longitudinal, equiangular and twisted relative to the tubular axis of the pasta. The mean thickness of the wall of the blades "p" is 0.7 mm, the mean thickness of the wall of the tubular axis "a" is 0.6 mm, and the mean diameter "d" of the hole of the axis is 1 mm.

These pastas have, in addition, a length of 40 mm, blades with a mean height, from the centre of the axis, of 8 mm and a degree of twisting of the blades of the order of 1 spire per 1.7 cm along the axis, so that the density of the pasta, as defined above, is of the order of 0.33 g/cm³.

These pastas are cooked as described in Example 1, then the quality of their texture in the mouth is tested by a group of people during a tasting test. The results are illustrated in Table 2 below.

Example 3

Pastas similar to those illustrated in FIG. 2 and described in Example 1 are manufacture by standard production means used by those skilled in the art, with the difference that they are manufactured by increasing the degree of twisting of the blades up to about 1 spire per 1.4 cm along the axis, so that the density of the pastas is of the order of 0.51 g/cm³.

They are cooked as described in Example 1, then the quality of their texture in the mouth is tested by a group of people during a tasting test as described below.

The assessment of the texture in the mouth of the pastas of the invention of Examples 1, 2 and 3 is determined by a tasting test involving about thirty people. The values are given as a percentage of people who found the pastas according to the invention to be similar to those of the corresponding comparative example (slow cooking traditional pasta of the helix type described in Example 1).

The results of the two tests carried out on the pastas of Examples 1, 2 and 3, as well as their cooking time, are illustrated in Table 2 below.

TABLE 2

| Pasta according to the invention | Texture in the mouth (%) | Cooking time (min) |
| --- | --- | --- |
| Example 1 | 80 | 5 |
| Example 2 | 71 | 5 |
| Example 3 | 87 | 5 |

As may be seen, the pastas according to the invention have a texture in the mouth which is substantially similar to that of slow cooking traditional pastas.

What is claimed is:

1. Twisted cooking pasta having, in transverse section, the shape of a helix comprising at least one blade attached to an axis, wherein the axis is hollow and of a sufficient diameter such that all starch in the pasta is fully cooked and the hollow axis closes upon cooking in boiling water for about 5 minutes, the thickness of the axis and the at least one blade each being between 0.3 and 1.1 mm, and the at least one blade is twisted to a degree such that the pasta has a density of between 0.2 and 0.7 g/cm³, the volume being defined as the cylindrical space occupied by the pasta.

2. Pasta according to claim 1, wherein the density is between 0.4 and 0.6 g/cm³.

3. Pasta according to claim 1, characterized in that the axis has a hole having a diameter of between 0.5 and 1.3 min.

4. Pasta according to claim 3, characterized as having a ratio between the thickness of the wall of the at least one blade and the thickness of the wall of the axis of between 1.2 and 2.

5. Pasta according to claim 3, characterized in that the thickness of the wall of the axis is between 0.3 and 0.7 mm and in that the thickness of the wall of the at least one blade is between 0.6 and 1.1 mm.

6. Pasta according to claim 1 characterized as having a water content of 10 to 13%.

7. Twisted cooking pasta having a hollow axis, and a helical shape in transverse section, the shape being formed by at least one blade attached to the axis, wherein the axis has an inner diameter which is sufficient to allow entry of water during cooking but which closes after cooking in boiling water for about 5 minutes, with all starch in the pasta being fully cooked during that time, the axis and the at least one blade each having a thickness of between 0.3 and 1.1 mm, and the pasta having a density of between 0.2 and 0.7 g/cm³, the volume being defined as the cylindrical space occupied by the pasta.

8. Pasta according to claim 7, wherein the density is between 0.4 and 0.6 g/cm³.

9. Pasta according to claim 7, wherein the inner diameter of the axis is between 0.5 and 1.3 mm.

10. Pasta according to claim 9, which has a ratio between the thickness of the at least one blade and the thickness of the axis of between 1.2 and 2.

11. Pasta according to claim 9, wherein the thickness of the wall of the axis is between 0.3 and 0.7 mm and the thickness of the least one blade is between 0.6 and 1.1 mm.

12. Pasta according to claim 7 characterized as having a water content of 10 to 13% before cooking.

13. Twisted cooking pasta having a hollow axis, and a helical shape in transverse section, the shape being formed by at least one blade attached to the axis, wherein the axis has an inner diameter of between 0.5 and 1.3 mm to allow entry of water during cooking but which closes after cooking in boiling water for about 5 minutes, with all starch in the pasta being fully cooked during that time, the axis and the at least one blade each having a thickness of between 0.3 and 1.1 mm, the pasta having a ratio between the thickness of the at least one blade and the thickness of the axis of between 1.2 and 2, and a density of between 0.2 and 0.7 g/cm³, the volume being defined as the cylindrical space occupied by the pasta.

* * * * *